Sept. 4, 1923.
K. D. SAULPAW
METHOD OF MANUFACTURING TIRES
Filed Aug. 14, 1919
1,466,942
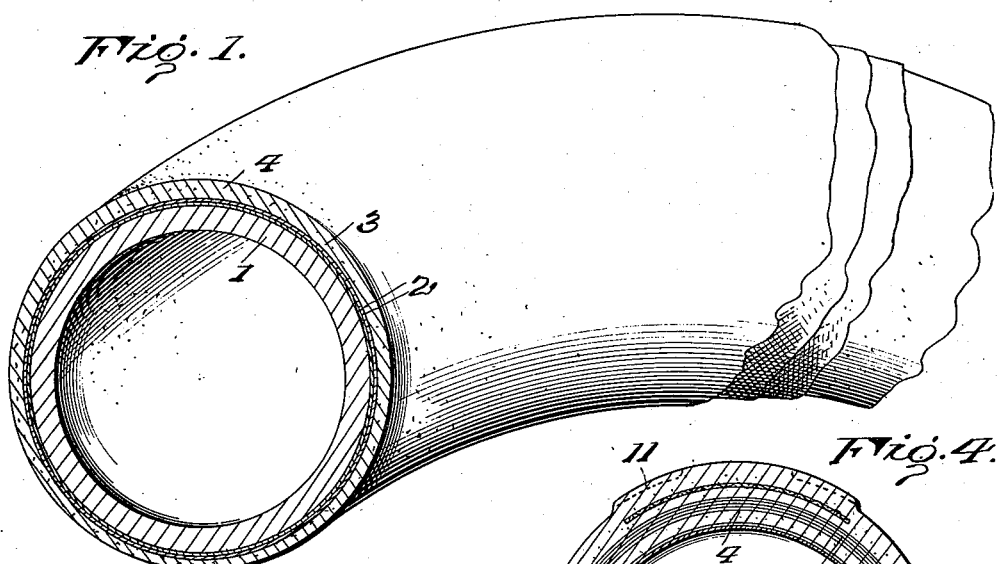
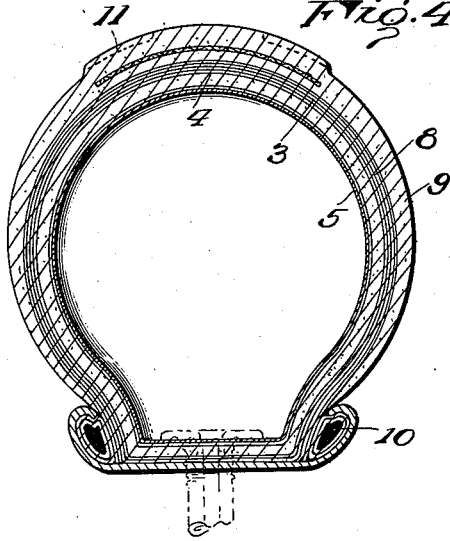
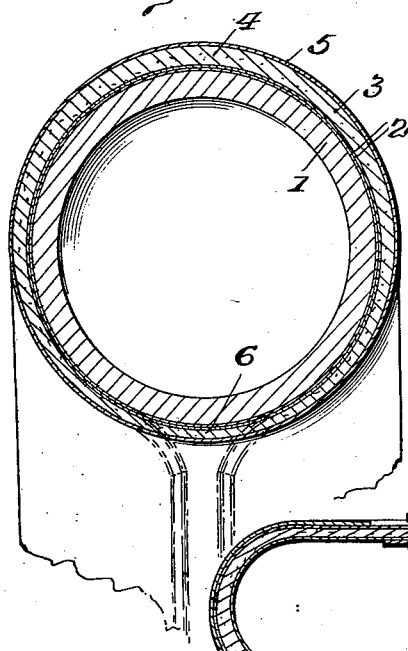
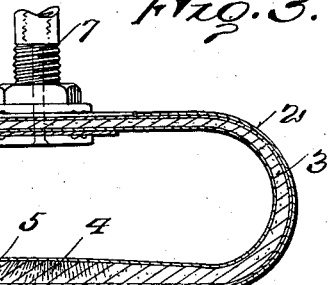
Inventor.
Karl D. Saulpaw
by Lacey & Lacey,
his Attys.

Patented Sept. 4, 1923.

1,466,942

UNITED STATES PATENT OFFICE.

KARL D. SAULPAW, OF CALHOUN, TENNESSEE.

METHOD OF MANUFACTURING TIRES.

Application filed August 14, 1919. Serial No. 317,460.

*To all whom it may concern:*

Be it known that I, KARL D. SAULPAW, a citizen of the United States, residing at Calhoun, in the county of McMinn and State of Tennessee, have invented certain new and useful Improvements in Methods of Manufacturing Tires, of which the following is a specification.

This invention relates to tires and a novel method of manufacturing the same.

The disadvantages and inconveniences attending the use of the usual form of tire comprising an inner tube and a casing or shoe are numerous and well recognized. On the other hand, it is a well recognized fact that a single tube tire may be comparatively readily repaired if punctured or if a blow-out occurs and without the inconvenience experienced in removing the shoe of the ordinary tire from the rim, removing the inner tube from the shoe, and then repairing both the inner tube and shoe which not infrequently requires vulcanization, or at least in the case of a blow-out in the shoe, resort to the use of a blow-out patch. It is, therefore, one of the primary objects of the present invention to provide, as a substitute for the ordinary tire comprising the inner tube and shoe or casing, a single tube tire possessing all of the wearing qualities of the ordinary tire and which tire will be substantially puncture proof in that it will possess the property of being self healing and will therefore not require immediate attention should it be subjected to a small puncture. Incidentally, the invention has as its object to provide against the inconvenience of slow leaks and of blow-outs resulting from the chafing or pinching of any portion of the tube which not infrequently occurs where inner tubes are employed.

Another object of the invention is to provide a tire of the single tube type so constructed that the air under pressure will be effectually retained therein for an indefinite period of time and, furthermore, so constructed as not to be as liable to deterioration and wear when run only partly inflated.

In conjunction with the foregoing objects the invention also has as its object to devise a novel method whereby a tire of the single tube type possessing the advantages stated, may be readily manufactured at a low cost.

In the accompanying drawings:

Figure 1 is a view partly in perspective and partly in section illustrating one of the first steps in carrying out the method of the invention;

Fig. 2 is a sectional view illustrating another step in the method;

Fig. 3 is a sectional view through a portion of the tire in condition for curing or vulcanization;

Fig. 4 is a sectional view through one form of tire completed in accordance with the method.

In the drawings, the numeral 1 indicates an annular mandrel which is circular in cross section, and in carrying out the method of the present invention, one or more plies of fabric, or other suitable material, indicated by the numeral 2, are applied to the mandrel and drawn over the same by rolling or otherwise so as to encompass the mandrel both in the direction of its circumference and transversely, these plies meeting, nearly meeting, or overlapping as may be found expedient, at their longitudinal edges at or substantially at the inner circumference of the mandrel. If these plies should fail to meet at their said edges, the space between their edges may be bridged by strips breaking joint with the plies. Also these plies of fabric or other material may be suitably treated before application to the mandrel if found desirable.

The next step in the method consists in placing one or more plies of rubber or tube stock, indicated by the numeral 3, upon the applied plies or layers 2 and pressing or rolling the same firmly into position. In this step, the rubber stock is applied in such manner that the composite layer of rubber will be thicker at and adjacent what is to constitute the tread of the tube in the finished tire, this thickened portion being indicated by the numeral 4. After the tire tube has been built up in the manner stated, the assemblage is subjected to a process of curing or vulcanization and in this step of the method it is preferable that the tube be only partially vulcanized or cured. However, the extent to which the tube is vulcanized or cured will depend largely upon the judgment of the manufacturer, and consequently the word "curing" in the claims is to be interpreted as comprehending any method of curing or vulcanization and carrying out of the method to any extent. In other words, I intend that the word as employed shall be considered to mean complete curing or only a partial curing or vulcanization.

The next step in the method consists in applying to the outer surface of the cured tube a layer 5 of uncured rubber or tube stock as shown in Fig. 2 of the drawings, this layer being rolled or otherwise smoothed down and completely surrounding or enclosing the said tube.

Following the last described step, the tube is split at its inner side along the line of the inner circumference of the mandrel 1 at the point indicated by the numeral 6 in Fig. 2 of the drawings, and after being so split, the edge portions of the tube may be turned out as illustrated in dot and dash lines in Fig. 2 and the tube stripped from the mandrel.

The tube is next reversed or turned inside out and its edges are brought together and united in any suitable manner, strips of fabric of other material being employed, if necessary, and breaking joint with the said edges of the tube. In carrying out this step of the method, the usual valve tube 7 may be applied to the tire tube and secured in place.

Fig. 3 of the drawings represents a cross sectional view of the tire tube as prepared by carrying out the previously described steps of the method and it will be evident by reference to this figure and to the foregoing description that the reversal of the tube after being stripped from the mandrel effects a compression of the rubber of the tube at all points in the inner surface of the tube although most pronounced at the tread portion of the tube as this portion is of greater thickness than the remaining portion. This compression of the rubber at the inner surface of the tube effectually provides against seepage of air from the tube, slow leaks, and leaks because of punctures, inasmuch as any puncture or opening made in the tube, unless of considerable size, will be automatically healed or closed because of the compression of the rubber and also due to the presence of the layer 5 of uncured rubber.

The tube in the condition shown in Fig. 3 of the drawings is next partially inflated and upon the same is built up the remainder of the tire, this being accomplished by application of one or more layers of fabric 8 and a suitable number of layers 9 of rubber stock, the tube being also provided with clincher beads 10 and any suitable form of tread lugs 11. Of course, this building up step will involve the use of a greater or less number of plies of fabric and rubber stock and tires of various designs may be thus produced. After the building up step, the whole is subjected to a process of vulcanization whereby the product is completed.

The tube produced by the method heretofore described will obviously present many advantages over the ordinary tire comprising an inner tube and a casing or shoe, as before pointed out there is no likelihood of seepage of air or the occurrence of a slow leak, and punctures of an ordinary size will be automatically closed and healed so as not to require repair of the tube.

Where in the specification and claim I refer to the use of fabric, I mean any kind of fabric usually employed or capable of employment for this purpose, or any composition of the same with rubber or other materials and treated in any manner.

Having thus described the invention, what is claimed as new is:

The method of manufacturing a pneumatic tire which comprises the steps of applying about an annular mandrel one or more plies of fabric material completely surrounding the mandrel both in the direction of its circumference and transversely, applying one or more plies of rubber stock about the applied fabric plies in such manner that the rubber layer will be thicker at and adjacent what is to constitute the tread side of the tire, treating the assemblage to partially cure and partially vulcanize the same, applying to the outer surface of the assemblage a layer of uncured rubber to completely enclose the assemblage, splitting the assemblage along the line of the inner circumference of the mandrel, removing the assemblage and turning the same inside out, bringing the edges of the assemblage together, uniting them, and building up upon the assemblage a plurality of plies of fabric completely surrounding the assemblage both circumferentially and transversely and one or more plies of rubber stock extending over the tread and side surfaces of the assemblage, and finally subjecting the whole to vulcanization.

In testimony whereof I affix my signature.

KARL D. SAULPAW. [L. S.]